Dec. 14, 1926.
C. H. AYARS
1,610,236
MACHINE FOR QUARTERING VEGETABLES
Filed March 24, 1926    4 Sheets-Sheet 1
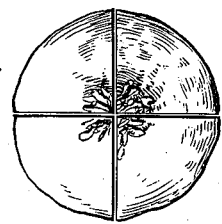
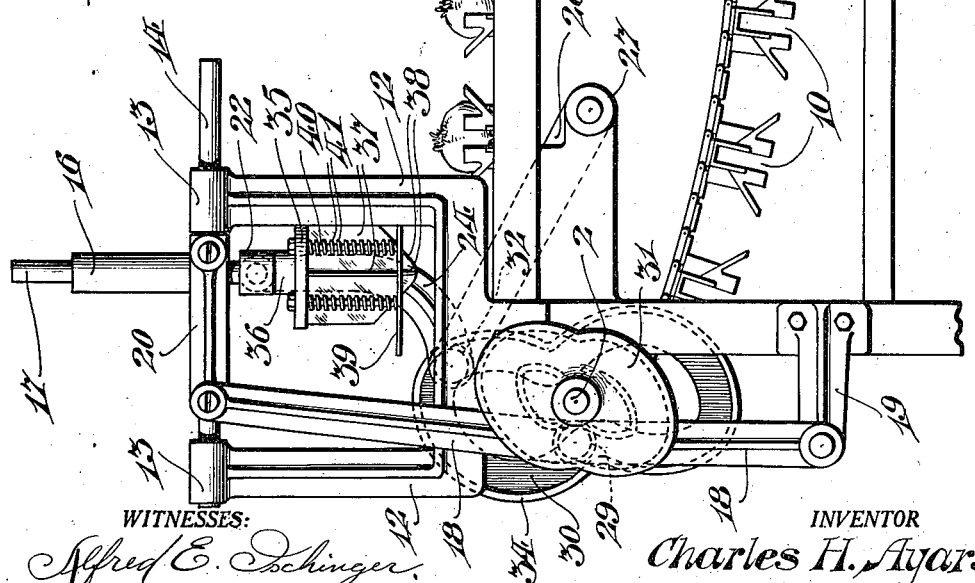
WITNESSES:
INVENTOR
Charles H. Ayars,
BY
Joshua R. H. Toth
ATTORNEY Dec. 14, 1926.  1,610,236
C. H. AYARS
MACHINE FOR QUARTERING VEGETABLES
Filed March 24, 1926   4 Sheets-Sheet 2

WITNESSES:
Alfred E. Ischinger
George A. Gruss

INVENTOR:
Charles H. Ayars,
BY
Joshua R. H. Potts
ATTORNEY

Dec. 14, 1926.

C. H. AYARS

MACHINE FOR QUARTERING VEGETABLES

Filed March 24, 1926      4 Sheets-Sheet 4

1,610,236

WITNESSES:
Alfred E. Ischinger.
George A. Gruss

INVENTOR:
Charles H. Ayars,
BY
Joshua R. H. Potts
ATTORNEY

Patented Dec. 14, 1926.

1,610,236

UNITED STATES PATENT OFFICE.

CHARLES H. AYARS, OF SALEM, NEW JERSEY, ASSIGNOR TO AYARS MACHINE COMPANY, OF SALEM, NEW JERSEY.

MACHINE FOR QUARTERING VEGETABLES.

Application filed March 24, 1926. Serial No. 96,949.

In preparing vegetables such as beets for canning, the vegetables are graded as to size. Small vegetables are canned whole, those of medium size are preferably cut in halves and the larger grade cut into quarters.

The object of my invention is to provide simple and efficient mechanism for dividing vegetables into quarters.

This object, and other advantageous ends which will be described hereinafter, I attain in the following manner, reference being had to the accompanying drawings in which—

Figure 1 is a side elevation of a machine embodying my invention,

Figure 2 is a perspective view of a quartered beet,

Figure 3:
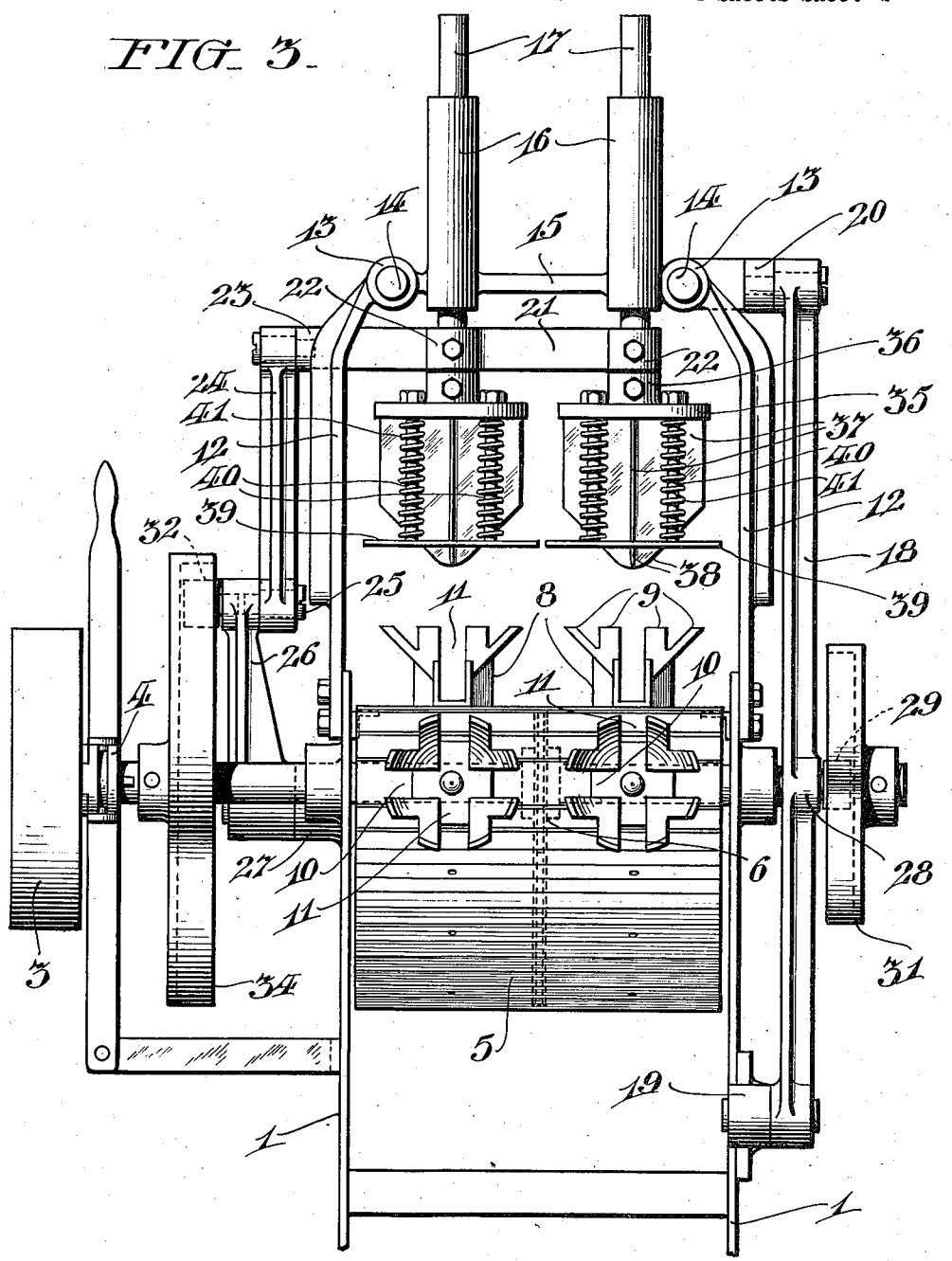
Figure 3 is an end elevation of the machine shown in Figure 1.
Figure 4:
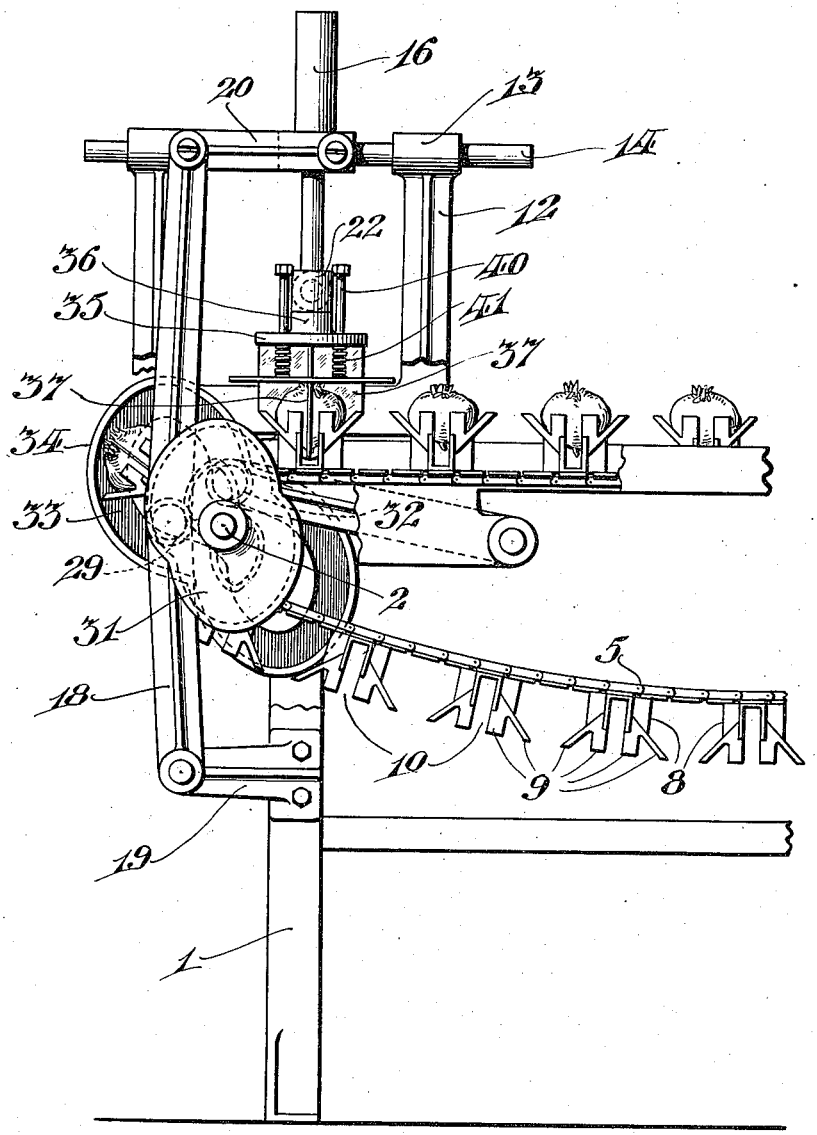
Figure 4 is a fragmentary side elevation of the machine, with parts of the frame cut away, showing the parts in a different position from that shown in Figure 1.
Figure 5:
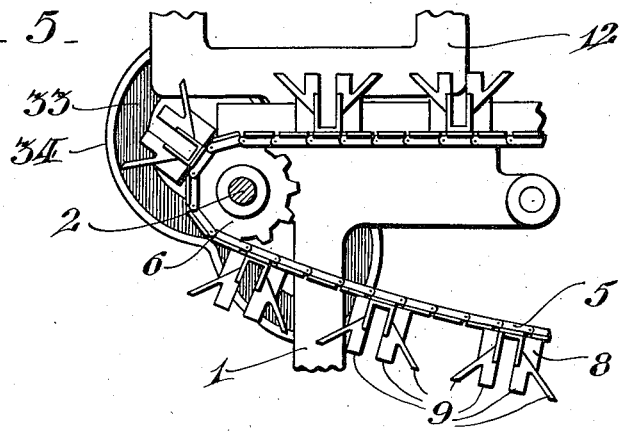
Figure 5 is a fragmentary longitudinal section showing parts of the driving mechanism.
Figure 6:
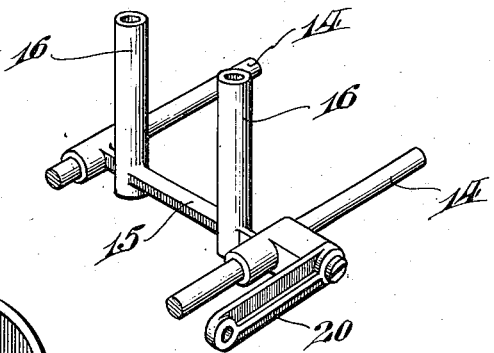
Figures 6, 7 and 8 are details of some of the working parts.
Figure 7:
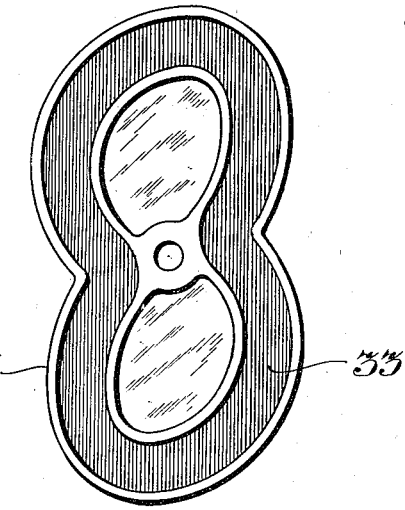
Figure 8:
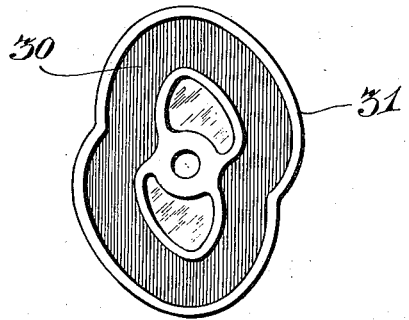

Referring to the drawings the numeral 1 designates the frame of the machine, 2 the driving shaft, 3 the driving pulley, 4 a clutch by which the pulley may be connected or disconnected from the shaft, and 5 an endless carrier mounted to travel over a driving sprocket 6 on the driving shaft and a sprocket 7 upon the other end of the frame. A series of equally spaced skeleton pockets 8 is mounted on the carrier. The pocket consists of fingers 9 inclined toward their base and providing longitudinal and transverse channels 10 and 11. As shown, there are two series of pockets arranged side by side. Arms 12, extending upwardly from the frame provide bearings 13 for horizontally disposed rods 14 upon which a frame 15 is slidably mounted. This frame carries a pair of vertically extending sleeves 16 in which the stems 17 of the knives are slidable. One end of a lever 18 is pivoted to a bracket 19 extending from the frame of the machine and its other end is connected with frame 15 by a link 20.

A cross bar 21 is fixed to the stems of the knives by collars 22. The cross bar is pivotally connected at 23 to an arm 24 the other end of which is connected with a pivot pin 25 to which an arm 26, pivotally connected with the frame of the machine at 27, is also pivoted. Lever 18 is provided with a hub 28 in which the axle of a roller 29 is seated. The roller extends into a cam groove 30 in a cam 31 fixed to the driving shaft, and the cam groove is so disposed that rotation of the cam will impart reciprocating motion to the lever which will impart a horizontally reciprocating motion to frame 15. Pivot pin 25 carries a roller 32 which extends into a cam groove 33 in a cam 34, fixed to the driving shaft, and the cam groove is so disposed that rotation of the cam will impart downward and upward movement to arm 24 thereby imparting vertically reciprocating motion to the knife stems and consequently to the knives.

The paths described by the cam grooves are such that the advance horizontal movement of the frame 15 will coincide in speed with the speed of the endless carrier, and the return movement will be at somewhat greater speed and the movement of the knife carrier will be so timed as to reach the limit of its downward movement when frame 15 is midway of its advance movement and that it reaches its starting position by the time frame 15 begins another advance movement.

The knives consist of a base 35, which is secured to the knife stem by a collar 36, and blades 37 extending downwardly from the base. The knives include 4 blade elements extending from a common center, at right angles to each other and having their cutting faces 38 inclined toward the common center.

To guard against the cut vegetables adhering to the knives when the latter are withdrawn I provide stripping plates 39 through which the knives project, which are carried by bolts 40, slidably mounted in holes in base 35, and the stripping plates are normally held in their downward position by coiled springs 41 encircling the bolts and engaging the base of the knives and the stripping plates.

While I have described my invention as taking a particular form, it will be understood that the various parts may be changed without departing from the spirit thereof, and hence I do not limit myself to the precise construction set forth, but consider that I am at liberty to make such changes and alteration as fairly come within the scope of the appended claims.

Having thus described my invention, what I claim as new and desire to secure by Letters Patent is:—

1. In a vegetable quartering machine; a frame; an endless carrier mounted thereon; a series of pockets mounted on the carrier; a knife; means for reciprocating the knife in the line of travel of the carrier; means for concurrently reciprocating the knife in a vertical plane, and means for actuating the carrier.

2. In a vegetable quartering machine; a frame; an endless carrier mounted thereon; a series of pairs of pockets mounted on the carrier; a pair of knives; means for reciprocating the knives in the line of travel of the carrier; means for concurrently reciprocating the knives in a vertical plane, and means for actuating the carrier.

3. In a vegetable quartering machine; a frame; an endless carrier mounted thereon; a series of pairs of pockets mounted on the carrier; a pair of knives; stems carrying the knives; a frame in which the stems are slidable; means for reciprocating said frame in the line of travel of the carrier; a bar fixed to the stems; means for actuating the bar to lower and raise the knives, and means for actuating the carrier.

4. In a vegetable quartering machine; a frame; an endless carrier mounted thereon; a series of pairs of pockets mounted on the carrier; a pair of knives; stems carrying the knives; a slidable frame in which the stems are slidable; a lever pivoted to the frame of the machine; a link connecting the lever with the slidable frame; means for actuating the lever to impart horizontal reciprocatory motion to said frame; means for concurrently reciprocating the knives in a vertical plane, and means for actuating the carrier.

5. In a vegetable quartering machine; a frame; an endless carrier mounted thereon; a series of pairs of pockets mounted on the carrier; a shaft adapted to actuate the carrier; a pair of knives; stems carrying the knives; a slidable frame in which the stems are slidable; a lever pivoted to the frame of machine; a link connecting the lever with the slidable frame; a grooved cam fixed to the driving shaft; a roller carried by the lever and taking into the cam groove, the cam being adapted to actuate the lever to reciprocate the slidable frame in a horizontal plane, and means for concurrently reciprocating the knives in a vertical plane.

6. In a vegetable quartering machine; a frame; an endless carrier mounted thereon; a series of pairs of pockets mounted on the carrier; a shaft adapted to actuate the carrier; a pair of knives; stems carrying the knives; a bar fixed to the stems; an arm pivotally connecting the bar with a pivot pin; an arm pivotally connecting the pivot pin with the machine frame; a grooved cam fixed to the driving shaft, and a roller carried by the pivot pin and taking into the cam grooves, the cam being adapted to actuate the arm connected with the knife carrying bar to reciprocate the bar and the knives in a vertical plane, and means for concurrently reciprocating the knives in the line of travel of the carrier.

7. In a vegetable quartering machine; a frame; an endless carrier mounted thereon; a series of pairs of pockets mounted on the carrier; a shaft adapted to actuate the carrier; a pair of knives; stems carrying the knives; a slidable frame in which the stems are slidable; a lever pivoted to the frame of the machine; a link connecting the lever with the slidable frame; a grooved cam fixed to the driving shaft; a roller carried by the lever and taking into the cam groove, the cam being adapted to actuate the lever to horizontally reciprocate the slidable frame; a bar fixed to the stems; an arm pivotally connecting the bar with a pivot pin; an arm pivotally connecting the pivot pin with the machine frame; a grooved cam fixed to the driving shaft, and a roller carried by the pivot pin and taking into the cam groove, the cam being adapted to actuate the arm connected with the knife carrying bar to reciprocate the bar and the knives in a vertical plane.

8. In a vegetable cutting machine, a frame; an endless carrier mounted thereon; a series of pairs of pockets mounted on the carrier, the pockets having a plurality of diametrical channels; a knife having a plurality of blade elements registering with the channels; means for reciprocating the knife in the line of travel of the carrier; means for concurrently reciprocating the knife in a vertical plane, and means for actuating the carrier.

9. In a vegetable splitting machine having a continuously operated endless carrier; pockets on the carrier; a knife; means for reciprocating the knife in the line of travel of the carrier, and means for reciprocating the knife in the vertical plane whereby said reciprocations will synchronize with the movement of the pockets.

10. In a vegetable splitting machine having a continuously operated endless carrier; pockets on the carrier; a pair of multi-bladed knives adapted to successively co-act with the pockets; means for reciprocating the knife in the line of travel of the carrier, and means for reciprocating the knife in the vertical plane whereby said reciprocations will synchronize with the movement of the pockets.

In testimony whereof, I have signed my name to this specification.

CHARLES H. AYARS.